United States Patent
Stabler et al.

(10) Patent No.: US 11,544,472 B2
(45) Date of Patent: Jan. 3, 2023

(54) STRUCTURED ADVERSARIAL TRAINING FOR NATURAL LANGUAGE MACHINE LEARNING TASKS

(71) Applicant: Samsung Electronics Co., Ltd., Suwon-si (KR)

(72) Inventors: Edward P. Stabler, San Jose, CA (US); Benjamin Goldsmith, San Jose, CA (US); Hendrik Harkema, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 16/799,495

(22) Filed: Feb. 24, 2020

(65) Prior Publication Data

US 2021/0224486 A1    Jul. 22, 2021

Related U.S. Application Data

(60) Provisional application No. 62/962,362, filed on Jan. 17, 2020.

(51) Int. Cl.
*G06F 40/35*    (2020.01)
*G06F 40/166*   (2020.01)
(Continued)

(52) U.S. Cl.
CPC ............ *G06F 40/35* (2020.01); *G06F 40/166* (2020.01); *G06F 40/205* (2020.01); *G06F 40/30* (2020.01);
(Continued)

(58) Field of Classification Search
CPC . G06N 3/08; G06N 20/00; G06N 3/02; G06F 40/205; G06F 40/30; G06F 40/00
See application file for complete search history.

(56) References Cited

U.S. PATENT DOCUMENTS 9,666,184 B2   5/2017  Lee et al.
2015/0220511 A1  8/2015  Yang et al.
(Continued)

FOREIGN PATENT DOCUMENTS

| CN | 109710915 A | 5/2019 |
| JP | 6556381 B2 | 8/2019 |
| KR | 10-1962113 B1 | 7/2019 |

OTHER PUBLICATIONS

Ebrahimi et al., "Hotflip: White-box adversarial examples for text classification." arXiv preprint arXiv:1712.06751 (Year: 2017).*
(Continued)

*Primary Examiner* — Samuel G Neway

(57) ABSTRACT

A method includes obtaining first training data having multiple first linguistic samples. The method also includes generating second training data using the first training data and multiple symmetries. The symmetries identify how to modify the first linguistic samples while maintaining structural invariants within the first linguistic samples, and the second training data has multiple second linguistic samples. The method further includes training a machine learning model using at least the second training data. At least some of the second linguistic samples in the second training data are selected during the training based on a likelihood of being misclassified by the machine learning model.

20 Claims, 6 Drawing Sheets

(51) Int. Cl.
| | |
|---|---|
| *G06N 20/00* | (2019.01) |
| *G06K 9/62* | (2022.01) |
| *G06V 10/70* | (2022.01) |
| *G06N 3/02* | (2006.01) |
| *G06N 3/08* | (2006.01) |
| *G06F 40/30* | (2020.01) |
| *G06F 40/205* | (2020.01) |

(52) U.S. Cl.
CPC .............. *G06K 9/6257* (2013.01); *G06N 3/02* (2013.01); *G06N 3/08* (2013.01); *G06N 20/00* (2019.01); *G06V 10/768* (2022.01)

(56) References Cited

U.S. PATENT DOCUMENTS

| | | | | |
|---|---|---|---|---|
| 2020/0226212 | A1* | 7/2020 | Tan | G06F 16/35 |
| 2020/0227030 | A1* | 7/2020 | Tan | G06F 40/30 |
| 2021/0224486 | A1* | 7/2021 | Stabler | G06F 40/56 |

OTHER PUBLICATIONS

Vijayaraghavan et al., "Generating black-box adversarial examples for text classifiers using a deep reinforced model." Joint European Conference on Machine Learning and Knowledge Discovery in Databases. Springer, Cham (Year: 2019).*

Karpukhin, Vladimir, et al., "Training on synthetic noise improves robustness to natural noise in machine translation." arXiv preprint arXiv:1902.01509 (Year: 2019).*

Zhang et al., "Adversarial Attacks on Deep Learning Models in Natural Language Processing: A Survey", arXiv:1901.06796, Apr. 2019, 40 pages.

Michel et al., "On Evaluation of Adversarial Perturbations for Sequence-to-Sequence Models", Proceedings of the 2019 Conference of the North American Chapter of the Association for Computational Linguistics: Human Language Technologies, vol. 1 (Long and Short Papers), Jun. 2019, pp. 3103-3114.

Shah et al., "Building a Conversational Agent Overnight with Dialogue Self-Play", arXiv:1801.04871 [cs.AI], Jan. 2018, 11 pages.

Shah et al., "Bootstrapping a Neural Conversational Agent with Dialogue Self-Play, Crowdsourcing and On-Line Reinforcement Learning", Proceedings of the 2018 Conference of the North American Chapter of the Association for Computational Linguistics: Human Language Technologies, vol. 3 (Industry Papers), Jun. 2018, pp. 41-51.

Jalalvand et al., "Automatic Data Expansion for Customer-care Spoken Language Understanding", arXiv:1810.00670, Oct. 2018, 10 pages.

Søgaard et al., "Nightmare at test time: How punctuation prevents parsers from generalizing", Proceedings of the 2018 EMNLP Workshop BlackboxNLP: Analyzing and Interpreting Neural Networks for NLP, Nov. 2018, pp. 25-29.

Stabler, "Towards a rationalist theory of language acquisition", Journal of Machine Learning Research: Workshop and Conference Proceedings, vol. 34, Proceedings of the 12th International Conference on Grammatical Inference, Aug. 2014, pp. 21-32.

Goodfellow et al., "Explaining and Harnessing Adversarial Examples", International Conference on Learning Representations, May 2015, 11 pages.

LeCun et al., "Gradient-Based Learning Applied to Document Recognition", Proceedings of the IEEE, vol. 86, No. 11, Nov. 1998, pp. 2278-2324.

Stabler et al., "Universals across languages", 19th European Summer School in Logic, Language and Information (ESSLLI'07), Workshop on Model Theoretic Syntax, Aug. 2007, 12 pages.

Dozat et al., "Simpler but More Accurate Semantic Dependency Parsing", Proceedings of the 56th Annual Meeting of the Association for Computational Linguistics (Short Papers), Jul. 2018, pp. 484-490.

Google, "Natural Language", Google Cloud, AI & Machine Learning Products, captured Dec. 2019, 14 pages.

Gupta et al., "Semantic Parsing for Task Oriented Dialog using Hierarchical Representations", Proceedings of the 2018 Conference on Empirical Methods in Natural Language Processing, Oct. 2018, pp. 2787-2792.

Yoshinaka et al., "Polynomial Time Learning of Some Multiple Context-Free Languages with a Minimally Adequate Feacher", Proceedings of the15th and 16th International Conferences on Formal Grammar, Aug. 2010, pp. 192-207.

Clark, "Learning Context Free Grammars with the Syntactic Concept Lattice", Proceedings of the 10th International Colloquium Conference on Grammatical Inference: Theoretical Results and Applications, Sep. 2010, pp. 38-51.

Qi et al., "Universal Dependency Parsing from Scratch", Proceedings of the CoNLL 2018 Shared Task: Multilingual Parsing from Raw Text to Universal Dependencies, Oct. 2018, pp. 160-170.

Grafakos, "§2.5 Convolution Operators on LP Spaces and Multipliers", Graduate Texts in Mathematics: Classical Fourier Analysis, Third Edition, Springer Science+Business Media, 2014, pp. 146-161.

Rich et al., "Using Collaborative Discourse Theory to Partially Automate Dialogue Tree Authoring", International Conference on Intelligent Virtual Agents, Sep. 2012, pp. 327-340.

Allen et al., "PLOW: A Collaborative Task Learning Agent", Proceedings of the 22nd National Conference on Artificial Intelligence, vol. 2, Jul. 2007, pp. 1514-1519.

Shen et al., "OAR: A Formal Framework for Multi-Agent Negotiation", Proceedings of the 20th National Conference on Artificial Intelligence, vol. 1, Jul. 2005, pp. 176-183.

Mohseni-Kabir et al., "Interactive Hierarchical Task Learning from a Single Demonstration", Proceedings of the Tenth Annual ACM/IEEE International Conference on Human-Robot Interaction, Mar. 2015, pp. 205-212.

Kirk et al., "A Demonstration of Interactive Task Learning", Proceedings of the Twenty-Fifth International Joint Conference on Artificial Intelligence, Jul. 2016, pp. 4248-4249.

Liu et al., Dialogue Learning with Human Teaching and Feedback in End-to-End Trainable Task-Oriented Dialogue Systems, Proceedings of the 2018 Conference of the North American Chapter of the Association for Computational Linguistics: Human Language Technologies, vol. 1 (Long Papers), Jun. 2018, pp. 2060-2069.

Liu et al., "End-to-End Learning of Task-Oriented Dialogs", Proceedings of the 2018 Conference of the North American Chapter of the Association for Computational Linguistics: Student Research Workshop, Jun. 2018, pp. 67-73.

Nooraei et al., "A Real-Time Architecture for Embodied Conversational Agents: Beyond Turn-Taking", 7th International Conference on Advances in Computer-Human Interactions, May 2014, 9 pages.

International Search Report and Written Opinion of the International Searching Authority in connection with International Patent Application No. PCT/KR2020/007078 dated Oct. 8, 2020, 10 pages.

* cited by examiner

STRUCTURED ADVERSARIAL, TRAINING FOR NATURAL LANGUAGE MACHINE LEARNING TASKS

CROSS-REFERENCE TO RELATED APPLICATION AND PRIORITY CLAIM

This application claims priority under 35 U.S.C. § 119(e) to U.S. Provisional Patent Application No. 62/962,362 filed on Jan. 17, 2020, which is hereby incorporated by reference in its entirety.

TECHNICAL FIELD

This disclosure relates generally to machine learning systems. More specifically, this disclosure relates to structured adversarial training for natural language machine learning tasks.

BACKGROUND

Natural language processing is becoming more and more important in a large number of applications. For example, natural language processing is routinely used to allow a human and a virtual assistant, smart device, or other machine to interact through verbal communications. Often times, natural language processing is performed using machine learning systems, which operate using models trained for specific tasks. As a particular example, "semantic parsing" refers to a machine learning task that converts natural language utterances into machine-understandable representations of the meanings of those utterances. In some cases, semantic parsing is designed for use with natural language utterances related to a specific topic, which is often referred to as "restricted domain" semantic parsing.

Many natural language machine learning models cannot be trained effectively without the use of an extensive amount of annotated training data, meaning training data whose meanings or other characteristics are already known (with labels identifying those characteristics). Unfortunately, annotated training data can be expensive to collect. As a result, obtaining a high-accuracy language model is often difficult even in restricted domains, since it is routinely infeasible to collect adequate annotated data for training. With limited training data, a language model may incorrectly classify many inputs, which can be very frustrating for users of applications that operate based on the model.

SUMMARY

This disclosure provides structured adversarial training of natural language machine learning tasks.

In a first embodiment, a method includes obtaining first training data having multiple first linguistic samples. The method also includes generating second training data using the first training data and multiple symmetries. The symmetries identify how to modify the first linguistic samples while maintaining structural invariants within the first linguistic samples, and the second training data has multiple second linguistic samples. The method further includes training a machine learning model using at least the second training data. At least some of the second linguistic samples in the second training data are selected during the training based on a likelihood of being misclassified by the machine learning model.

In a second embodiment, an apparatus includes at least one memory configured to store first training data having multiple first linguistic samples. The apparatus also includes at least one processor configured to generate second training data using the first training data and multiple symmetries. The symmetries identify how to modify the first linguistic samples while maintaining structural invariants within the first linguistic samples, and the second training data has multiple second linguistic samples. The at least one processor is also configured to train a machine learning model using at least the second training data. The at least one processor is configured to select at least some of the second linguistic samples in the second training data during the training based on a likelihood of being misclassified by the machine learning model.

In a third embodiment, a non-transitory computer readable medium contains instructions that when executed cause at least one processor to obtain first training data having multiple first linguistic samples. The medium also contains instructions that when executed cause the at least one processor to generate second training data using the first training data and multiple symmetries. The symmetries identify how to modify the first linguistic samples while maintaining structural invariants within the first linguistic samples, and the second training data has multiple second linguistic samples. The medium further contains instructions that when executed cause the at least one processor to train a machine learning model using at least the second training data. The instructions that when executed cause the at least one processor to generate the second training data include instructions that when executed cause the at least one processor to select at least some of the second linguistic samples in the second training data during the training based on a likelihood of being misclassified by the machine learning model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
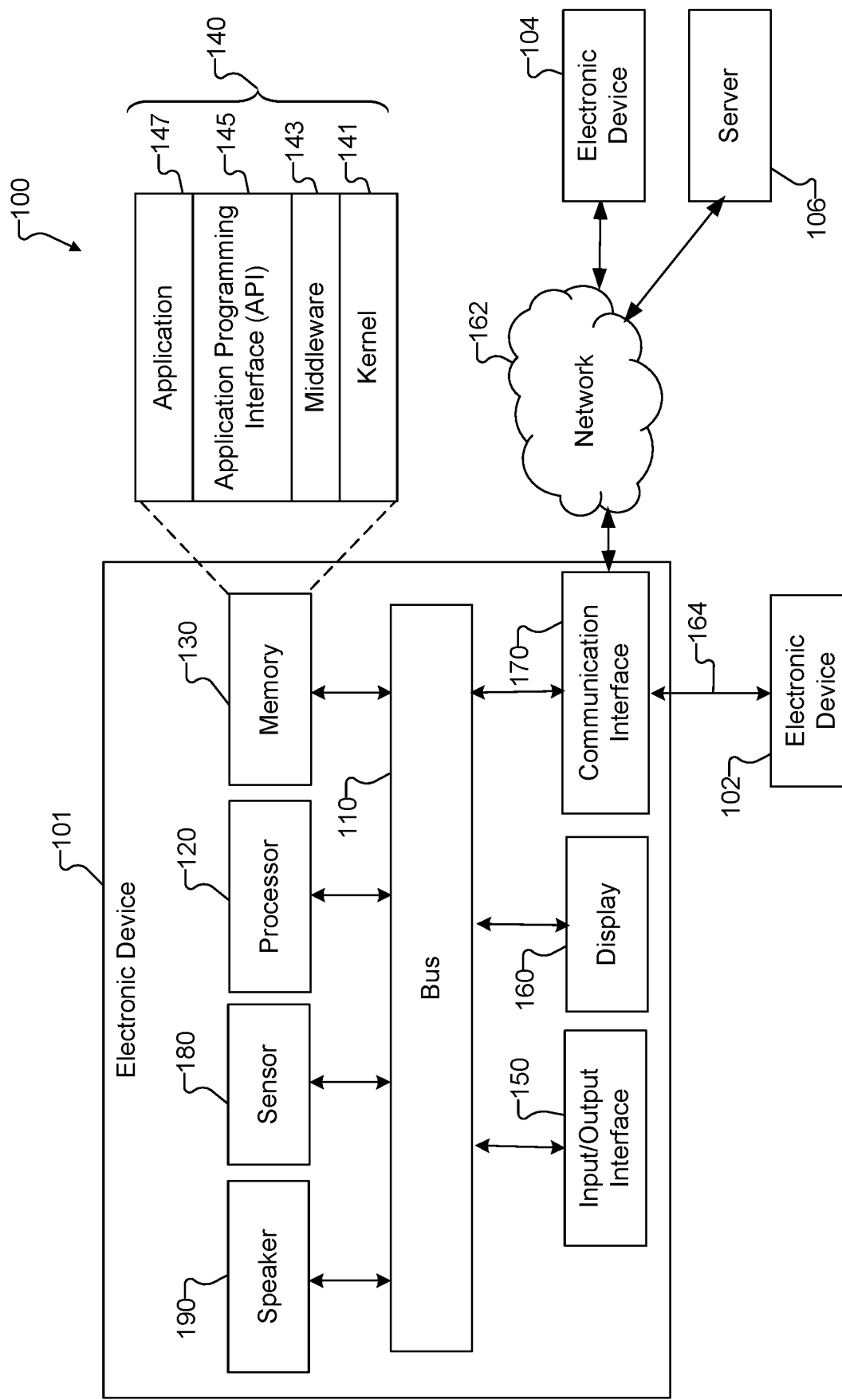
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many natural language machine learning models cannot be trained effectively without the use of an extensive amount of annotated training data, which can be expensive to collect. As a result, effectively training a natural language machine learning model is often difficult, even if a domain associated with the machine learning model is restricted. With limited training data, the machine learning model can incorrectly classify many inputs and frustrate users of an application that operates based on the model.

Consider the following example in which a semantic parser for a home Internet of Things (IoT) application uses a language model. In this type of application, users provide commands to automation controllers or other devices in order to initiate performance of actions related to IoT devices in the users' homes. The commands may relate to various actions, such as turning lights on or off, activating or deactivating security systems, playing or pausing music or video content, controlling televisions or speaker systems, answering doorbells, increasing or decreasing air conditioning or heating temperatures, or performing other functions. Parsing the users' commands correctly here is important in order to satisfy the users' intents, but it is extremely common for users (or even the same user) to express common commands in different ways.

One common type of command provided by IoT users is "if-then" commands, each of which includes (i) a condition and (ii) a command to be performed only if the condition is satisfied. As a particular example, a user may provide a verbal or typed command such as "if the door is open, turn on the light." Ideally, a sematic parser would parse this command into something like "[CONDITION if the [DEVICENAME door] is [DEVICESTATE open]] [GOAL POWERON turn on the [DEVICENAME light]]." This parsing effectively identifies the condition as being related to the state of the door and the action as being related to the state of the light. However, if the user provides a verbal or typed command such as "if the door is open turn on the light" (without a comma separating the condition and the action), even state-of-the-art parsers can incorrectly parse this command. For instance, a parser may actually identify the door as being the subject of the "turn on" action, which fails to properly identify the condition and action in the command.

Training a parser's language model with a dataset, even a large dataset, may not resolve these types of problems. While this particular problem (the lack of a comma) may be fixed by manually supplementing training data to include a command without a comma, there are numerous similar types of problems that can be experienced in day-to-day usage of natural language. While humans are easily capable of ignoring structurally-small variations in speech or text, extensively-trained cloud-based parsers or other natural language machine learning systems can routinely fail to properly classify inputs having structurally-small variations, even when a domain of interest is quite narrow.

Not only that, many applications could be improved by supporting language interfaces that recognize dialogue contexts, particularly when a dialogue introduces new terms. A natural language model that forgets context from one utterance to the next can frustrate users. Also, it may be desirable in extreme cases for a natural language system to be competent in its interactions with users based on very little training data (sometimes just one use of a new phrase). Unlike the problems discussed above with respect to improperly-classified inputs caused by structurally-small variations, the problem here involves the need to train a machine learning model over unboundedly many dialogue contexts and user updates. This is typically not possible even with a large collection of annotated training data.

This disclosure provides various techniques related to structured adversarial training for natural language machine learning tasks. As described in more detail below, these techniques recognize that initial linguistic samples used in initial training data for a natural language machine learning model have structural invariants that should be respected during the training. This information can be used to generate additional linguistic samples in additional training data for the natural language machine learning model, where the additional linguistic samples maintain the structural invariants. Moreover, these techniques recognize that it is often useful to identify the additional linguistic samples that are very similar to the initial linguistic samples in the initial training data but that are misclassified by a natural language machine learning model. These are referred to as "adversarial examples" and could be based on only structurally-small variations in the initial training data. By combining these features, certain additional linguistic samples may be generated with three general properties: (i) they are relevant to a machine learning task associated with original training data, (ii) they need no new annotations relative to the original training data, and (iii) they correct errors made by a machine learning model being trained for that task.

Based on this, the techniques described below generate additional linguistic samples in additional training data for a natural language machine learning model based on initial linguistic samples in initial training data, and the additional training data is used to train the machine learning model. This is accomplished by incorporating a precise definition of structural invariants to be preserved in discrete domains of linguistic tasks. As a result, structural invariants used in the initial linguistic samples of the initial training data can be preserved in the automatically-generated additional linguistic samples used in the additional training data. These techniques can also incorporate a naturalness metric that allows unnatural additional linguistic samples to be excluded from use during training, such as when an additional linguistic sample that is automatically generated uses words or phrases not typically seen together.

These techniques also support searching for natural invariant-preserving additional linguistic samples that are "worst case" adversarial examples in the sense that the additional linguistic samples are very similar structurally to the original training data and yet maximally unexpected by a machine learning model. In other words, the additional linguistic samples may provide a higher likelihood of being misclassified by the machine learning model (even though they should be classified similarly as the initial linguistic samples), which provides a higher likelihood of training for the machine learning model. In some cases, the additional linguistic samples can be generated by making modifications to the initial linguistic samples, where the modifications are based on various "symmetries" applied to the initial linguistic samples. Example symmetries may include substitution symmetries (such as by replacing words or phrases with equivalent words or phrases or by substituting details that are irrelevant to a task), permutation symmetries (such as by switching the order of words or phrases), insertion/deletion symmetries (such as by inserting or removing articles or adjuncts, by inserting or removing politeness words or phrases, or by inserting or removing punctuation), and character-level or word-level symmetries (such as by swapping characters or words or adding or removing blank spaces to create typographical or grammatical errors). This allows known compositional adjustments to be made to the initial linguistic samples in order to generate the additional linguistic samples. Also, this can be accomplished without the need for new annotations to the additional linguistic samples, since the annotations of the initial linguistic samples can be preserved or updated based on the known compositional adjustments and used with the additional linguistic samples.

In this way, it is possible to significantly increase the amount of training data available to train a natural language machine learning model. In some cases, very little initial training data (such as few initial linguistic samples) may be needed, and numerous additional linguistic samples may be generated based on the initial linguistic samples and used during training. Among other things, this allows a machine learning model to be trained and operate more effectively even in the presence of structurally-small variations in inputs. With a much larger collection of training data used for training, a machine learning model can classify its inputs correctly much more frequently, improving user satisfaction with an application that operates based on the model. In addition, this can be accomplished without the time and expense typically associated with using large collections of manually-generated annotated training data.

In some cases, this functionality can be extended to supplement training dialogues, which represent collections of linguistic samples used to train a machine learning model in understanding task-oriented, multi-step dialogues or other types of multi-utterance dialogues. In these embodiments, knowledge of context can be used when generating the additional linguistic samples based on the initial linguistic samples. Also, original training dialogues can be modified (including based on the additional linguistic samples) to generate additional training dialogues. Again, various symmetries may be applied when generating the additional training dialogues. Example symmetries may include permutation symmetries (such as by switching the order of steps or subtasks in a dialogue) and interruption symmetries (such as by inserting a different dialogue into the steps of a current dialogue). Another naturalness metric can be used to allow unnatural dialogue to be excluded from use during training, and selected additional training dialogues may be used during training of a dialogue-based machine learning model. Again, this can significantly increase the amount of training data available to train a machine learning model, and this can be accomplished without the time and expense typically associated with using large collections of manually-generated annotated training data.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, or a speaker 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, the processor 120 may execute or otherwise provide structured adversarial training for one or more natural language machine learning tasks. In other embodiments of this disclosure, the processor 120 may interact with an external device or system that executes or otherwise provides structured adversarial training for one or more natural language machine learning tasks. In either case, the one or more machine learning tasks may be used to support interactions with users, including a user of the electronic device 101.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for providing (or for interacting with a device or system that provides) structured adversarial training for one or more natural language machine learning tasks. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more microphones, which may be used to capture utterances from one or more users. The sensor(s) 180 can also include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In addition, the electronic device 101 may include one or more speakers 190 that can convert electrical signals into audible sounds. For example, one or more speakers 190 may be used to audibly interact with at least one user. As a particular example, one or more speakers 190 may be used to provide verbal communications associated with a virtual assistant to at least one user. Of course, interactions with users may occur in any other or additional manner, such as via the display 160.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-190 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 provides or otherwise supports structured adversarial training for one or more natural language machine learning tasks, and the one or more machine learning tasks may be used to support interactions with users, including a user of the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
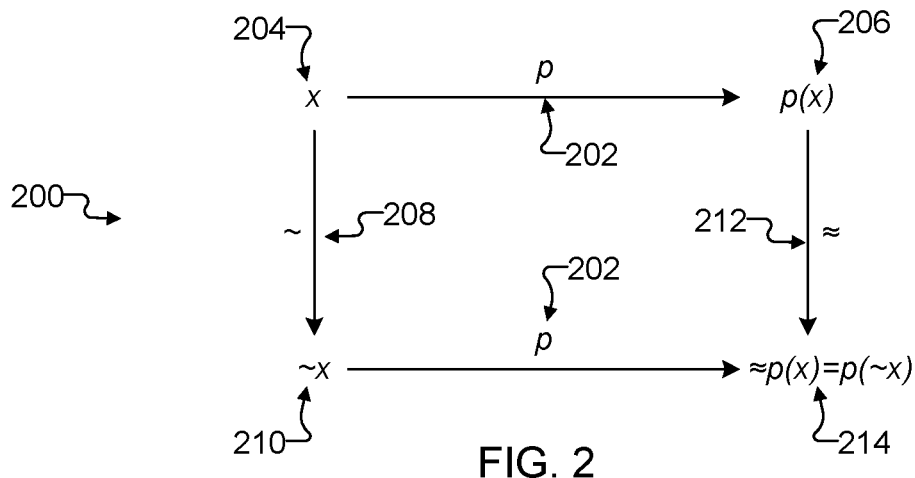
FIG. 2 illustrates an example technique for supplementing training data for a natural language machine learning task in accordance with this disclosure.

FIG. 2 illustrates an example technique 200 for supplementing training data for a natural language machine learning task in accordance with this disclosure. In particular, FIG. 2 illustrates an example technique 200 for modifying initial linguistic samples in initial training data to produce additional linguistic samples in additional training data, where the additional training data is used during training of a machine learning model. This technique 200 may be used, for instance, by the electronic device 101, server 106, or other component of FIG. 1 to supplement the training data available for use in training a natural language machine learning model. Note, however, that this technique 200 may be used by any other suitable device(s) and in any other suitable system(s).

As noted above, an adversarial example is a sample of input data that has been modified (typically very slightly) in a way intended to cause a machine learning model to misclassify the sample. When such examples exist, they indicate that the machine learning model has missed some kind of generalization that can otherwise be used to process input samples and classify them correctly. The notion of adversarial examples in the language domain can refer to situations where one or more modifications made to input examples (the initial linguistic samples) are "close" in terms of linguistic structure. The modifications may not necessarily be slight at the character-by-character or word-by-word level, at the word or phrase embedding level, or in terms of generally preserved meaning. However, because the adversarial examples are close in terms of linguistic structure, slight perturbations in linguistic structure can be made and allow for correct classifications to be computed compositionally, allowing misclassifications to be detected without new manually-created annotations.

The process of identifying adversarial examples that can be used as additional linguistic samples for use in training a natural language machine learning model is summarized in FIG. 2. In this example, suppose a machine learning model is being trained to learn a mapping 202 (denoted p) that maps initial training data 204 (denoted x) into output values 206 (denoted p(x)). The mapping 202 represents structural invariants, and the output values 206 represent semantic interpretations, syntactic analyses, or other machine-understandable representations of the data 204. In a typical training scenario, the initial training data 204 includes a (typically small) finite set $I \subset$ inputs for which there is an annotated training set T={(x, p(x))|x∈I}. It often turns out that the natural language machine learning model, if trained using only T, fails to properly generalize some inputs y that are not in I but that are "close" to I in the sense that (i) y=~x for some x∈I (where ~ is an easily-calculated function) and (ii) p(~x) is also easily calculated.

In the context of FIG. 2, it is possible to define a function 208 (denoted ~) that modifies the initial training data 204 to produce additional training data 210. Similarly, it is possible to define a function 212 (denoted ≈) that modifies the output values 206 to produce additional output values 214. Here, the functions 208 and 212 are defined such that the mapping 202 applied to the additional training data 210 and the function 212 applied to the output values 206 produce equivalent output values 214. Thus, given the function 208 on the data 204 and the function 212 on the values 206, it is possible to define a set AM={~x|x∈I, M(~x) !=p(~x)=≈p(x)}. Here, M(~x) represents a classification by the machine learning model, and p(~x) and ≈(x) represent a known correct classification.

The expression "M(~x) !=p(~x)=≈p(x)" indicates that the set AM includes adversarial examples, since the classifications by the machine learning model do not match the known correct classifications. As a result, when the functions 208 and 212 are chosen to make the set AM non-empty, the members of the set AM represent a set of adversarial examples for the machine learning model as defined by the functions 208 and 212. Note that the requirement here that p(~x)=≈p(x) simply indicates that the perturbation operators (~, ≈) commute with p in the standard sense. If the domain and range of p are disjoint and if ~ and ≈ satisfy the condition above, the union of ~ and ≈ is a homomorphism, which represents a symmetry that preserves p. For any two such homomorphisms f=(~, ≈) and g=(~', ≈') that preserve p, their composition f∘g is also a homomorphism that preserves p. Thus, given any set $S^i$ of such homomorphisms, it is possible to define $S^{i+1}=\{f \circ g | f \in S^i, g \in S^i\}$. Intuitively, elements of $S^i$ map an element (x, p(x)) for x∈I to a new element (~x, p(~x)) that is i steps away, preserving p.

Training with samples from one or more adversarial sets AM can sometimes help a machine learning model to recognize missed generalizations about p. As a result, training with samples from {(y, p(y)) y ∈AM} can help train the machine learning model more effectively. When ≈ is easy to calculate, there is little or no need to manually collect new values of p for elements of AM since {(~x, p(~x)) x∈I}={(~x, ≈p(x))|x∈I}, so no new manual annotations may be needed. Given this, it is possible to find the "closest" adversarial set AM of n examples in this discrete setting with an initial set $S^i$ of perturbations to explore. To do this, results obtained from $S^i$ (for i=1, 2, . . . ) can be searched, as long as incrementing i adds new examples. In settings where the correspondence between M(~x) and p(~x) are scored, the "worst" examples can be preferred at each stage i. This means that the cases where the score for M(~x) is maximally worse than the score for M(x) can be selected, since these are the adversarial examples most likely to result in misclassification by the machine learning system. Again, however, no manually-created annotations may be needed here, since the annotations of the initial data 204 can be used (or modified) automatically.

Note that this broad definition of adversarial examples does not require that ~x be perceptually similar to an original training element x or that ~x and x even mean the same thing. The functions 208, 212 may represent any functions that preserve the linguistic structure imposed by p. In some cases, the function 208 may be chosen in such a way that ~x is natural in the intended domain, meaning an element that further real-world sampling could have eventually discovered. Also, the function 208 may be chosen in such a way that ≈p(x) is easily computed. This can be achieved by restricting the function 208 to structural edits of the initial training data 204, which allows compositional meaning calculation. With these policies, manually-created annotations for the additional training data 210 are not needed, and the additional training data 210 may use the same annotations as the initial training data 204 or modified versions of the initial training data's annotations (based on known compositional meaning changes). This subsumes the case where the function 212 is an identity function but extends to a much broader range of cases, examples of which are discussed below.

It should be noted here that many languages are associated with a linguistic structure containing a number of structural invariants. Structural invariants generally represent linguistic objects (meaning expressions, properties of expressions, and relations between expressions) that are mapped to themselves, so one linguistic object cannot be replaced by another linguistic object while preserving how the meaning of an expression is determined. More formally, this can be expressed by defining structural invariants as representing linguistic objects that are preserved by stable automorphisms. Essentially, a structural invariant represents a property of linguistic samples that remains robust even under slight modifications. In the context here, a structural invariant may be defined (at least in part) on the specific task or tasks to be learned by a natural language model, meaning the structural invariant may be based at least partially on the associated domain. For instance, in an IoT domain, structural invariants may relate to the types of commands to be supported in the IoT domain.

Two example implementations are provided below for using the technique 200 to supplement initial linguistic samples in initial training data (the data 204) with additional linguistic samples in additional training data (the output values 214). The additional linguistic samples in the additional training data represent adversarial examples since they are likely to be misclassified by a natural language machine learning model. Moreover, the additional linguistic samples in the additional training data can be generated such that annotations of the additional linguistic samples match or are based on annotations of the initial linguistic samples. As a result, the additional linguistic samples may be used to improve the training of the natural language machine learning model, without requiring that the additional linguistic samples be collected and annotated manually.

Although FIG. 2 illustrates one example of a technique 200 for supplementing training data for a natural language machine learning task, various changes may be made to FIG. 2. For example, multiple functions 208 and multiple functions 212 may be used when generating the additional linguistic samples in the additional training data based on the initial linguistic samples in the initial training data.

Figure 3:
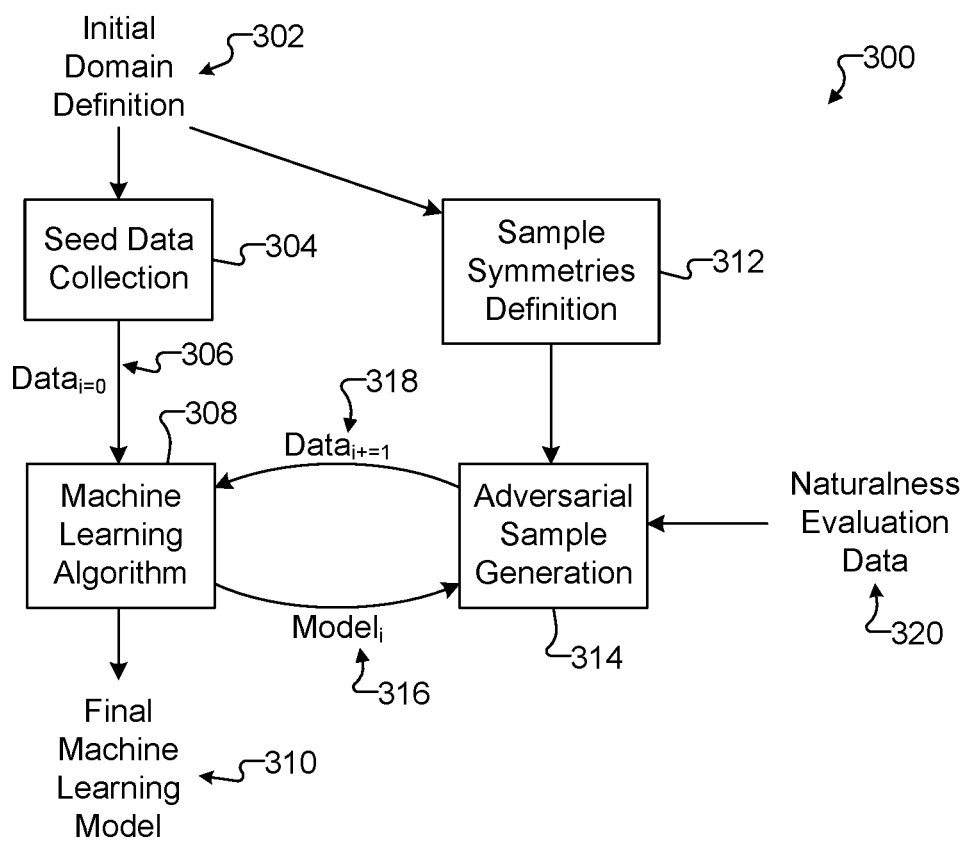
FIG. 3 illustrates a first example functional architecture for structured adversarial training for a natural language machine learning task in accordance with this disclosure.

FIG. 3 illustrates a first example functional architecture 300 for structured adversarial training for a natural language machine learning task in accordance with this disclosure. For ease of explanation, the functional architecture 300 shown in FIG. 3 may be described as being performed by the electronic device 101, server 106, or other component shown in FIG. 1 to supplement the training data available for use in training a natural language machine learning model. However, the functional architecture 300 shown in FIG. 3 may be used by any other suitable device(s) and in any other suitable system(s).

As shown in FIG. 3, an initial domain definition 302 is obtained. The initial domain definition 302 represents a definition or representation of the domain for which a natural language machine learning model is to be trained. As noted above, for example, the initial domain definition 302 may identify the topic or topics for which the natural language machine learning model is to be trained. Any suitable domain or collection of domains may be used here, and the initial domain definition 302 may contain any suitable information about the associated domain(s). The initial domain definition 302 may be generated in any suitable manner, such as manually or in an automated manner. The initial domain definition 302 helps guide a seed data collection process 304, which represents a process used to collect initial training data 306 (denoted $Data_{i=0}$) in the associated domain(s) for the natural language machine learning model to be trained. For instance, the seed data collection process 304 can involve the manual or automated collection of initial linguistic samples to be used as initial training data for the natural language machine learning model. Any suitable initial training data may be obtained and annotated, and the initial training data may be obtained and annotated in any suitable manner.

A machine learning algorithm 308 is executed and used to train a machine learning model using (among other things) the initial training data 306, plus additional training data that is generated as described below. The training performed using the machine learning algorithm 308 is typically iterative in nature. In this type of training process, the machine learning algorithm 308 receives training data and generates an intermediate language model based on that training data, and a determination is made whether the intermediate language model is adequately accurate. If not, the machine learning algorithm 308 performs another training iteration (possibly using more or different training data) to generate another intermediate language model, and a determination is made whether that intermediate language model is adequately accurate. Accuracy here can be measured in any suitable manner, such as by using $F_1$ scores. This process can be repeated over any number of iterations, typically until a language model is trained that has at least some desired level of accuracy. The language model can then be output as a final machine learning model 310, and the model 310 may then be used in a desired natural language application. The model 310 may be used in any suitable natural language application, such as a conversational assistant, a question answering (QA) system, an IoT home automation interface, a video game system, or an educational system. Note that any suitable machine learning algorithm 308 (now known or later developed) may be used here depending on the application.

As described above, if the initial training data 306 is small or otherwise inadequate, it may be difficult to obtain a model 310 having the desired level of accuracy. In order to help overcome these or other problems, the functional architecture 300 supports the technique 200 described above with respect to FIG. 2. In this example, this is accomplished by performing a sample symmetries definition process 312, which is used to identify different symmetries that can be applied to the initial training data 306 in order to generate additional training data. As noted above, the different symmetries can be used to help maintain structural invariants in the initial training data 306 while allowing adversarial examples to be created using structurally-small linguistic changes to the initial training data 306. Examples of the types of symmetries that may be selected in the symmetries definition process 312 and applied to the initial training data 306 are discussed below. The symmetries definition process 312 may be performed manually or in an automated manner.

The symmetries selected with the symmetries definition process 312 are used by an adversarial sample generation process 314, which represents an automated process that implements the symmetries selected by the symmetries definition process 312. In this example, the adversarial sample generation process 314 receives an intermediate model 316 (denoted Model$_i$) generated by the machine learning algorithm 308 in one iteration of the training process. The adversarial sample generation process 314 uses the intermediate model 316 to produce additional training data 318 (denoted Data$_{i+=1}$) for use during a subsequent iteration of the training process. The additional training data 318 includes additional linguistic samples, which represent initial linguistic samples from the initial training data 306 that have been modified in accordance with one or more of the symmetries selected by the symmetries definition process 312. At least some of the additional linguistic samples selected (based on the model 316) for use in the subsequent training iteration are adversarial examples, meaning the additional linguistic samples are selected based on their likelihood of being misclassified by the machine learning algorithm 308 during the subsequent iteration of the training process.

Note that the adversarial sample generation process 314 can make one or multiple changes to the initial linguistic samples from the initial training data 306 in order to generate the additional linguistic samples in the additional training data 318. In some embodiments, for example, the adversarial sample generation process 314 may make single changes to the initial linguistic samples in order to generate additional linguistic samples. If more adversarial examples are needed, the adversarial sample generation process 314 may then make two changes to the initial linguistic samples in order to generate more additional linguistic samples. The number of changes may continue to increase until a desired number of adversarial examples is obtained or some threshold number of changes is met. Note, however, that the additional linguistic samples may be generated in any other suitable manner based on any suitable number of changes to the initial linguistic samples. Also note that the additional linguistic samples selected for use in the additional training data 318 may represent adversarial examples that are as close as possible to the initial linguistic samples from the initial training data 306 while still causing the machine learning algorithm 308 to misclassify the additional linguistic samples.

The adversarial sample generation process 314 may be performed in any suitable manner. For example, the adversarial sample generation process 314 may be implemented using software instructions that are executed by the processor 120 of the electronic device 101, server 106, or other component(s) in FIG. 1. Note, however, that the adversarial sample generation process 314 may be performed using any other suitable component(s) in any suitable device(s) or system(s). Also, the adversarial sample generation process 314 may occur once or multiple times, possibly depending on how many iterations are performed as part of the training process using the machine learning algorithm 308. During each iteration where the adversarial sample generation process 314 generates additional training data 318, the adversarial sample generation process 314 can receive the most-recent intermediate model 316 generated by the machine learning algorithm 308, which helps the adversarial sample generation process 314 identify adversarial examples likely to be misclassified.

Naturalness evaluation data 320 may be used to provide information to the adversarial sample generation process 314 for use in excluding unnatural automatically-generated additional linguistic samples. For example, the naturalness evaluation data 320 may represent or include n-grams associated with the language used in the initial training data 306. The adversarial sample generation process 314 can use the naturalness evaluation data 320 to identify additional linguistic samples that are generated from the initial linguistic samples using the identified symmetries but that might appear unnatural (and therefore unlikely to be found during real-world use). Among other things, the adversarial sample generation process 314 may use the naturalness evaluation data 320 to identify additional linguistic samples that contain words or phrases typically not used next to each other in a sentence.

In some embodiments, the components of the functional architecture 300 may operate according to the following pseudocode. It should be noted, however, that other implementations of the functional architecture 300 are also possible. The operations of the machine learning algorithm 308 may be expressed as follows.

Data:=Seed Data, (Input, Value) Pairs
Model:=ML(Data)
While Accuracy(Model)<Requirement:
   Data+=Worst Case Adversaries(Ext, Rate, Model)
   Model:=ML(Data)

This indicates that the initial data 306 used for training (referred to as Data) includes the seed data and any associated input data 204/output value 206 pairs. The machine learning algorithm 308 is applied to this data in order to train an initial model (referred to as Model). If the accuracy of the initial model is below some threshold (referred to as Requirement), an iterative process is performed. During the iterative process, the training data is supplemented using worst-case adversarial examples provided by the adversarial sample generation process 314 as the additional training data 318, and another model is trained using the supplemented set of training data (which includes the adversarial examples). The adversarial examples produced here are a function of naturalness evaluation data 320 (referred to as Ext), a specified number of adversarial examples injected into the training data (referred to as Rate), and a model from the prior training iteration (which is used to identify adversarial examples likely to be misclassified by the machine learning algorithm 308). In some cases, the Rate value may vary during different iterations of the training process and can be tuned for each application. As a particular example, the Rate value may be set to 100% for the first iteration (meaning the adversarial sample generation process 314 can double the number of linguistic samples used for training), and other values (such as smaller values) can be used in subsequent iterations.

The operations of the sample symmetries definition process 312 may be expressed as follows.

Given the task mapping p: inputs→values:
  Define a set $S^i$ of symmetries of p that are minimal input-edit, output-edit mappings ($\sim$, $\approx$) that commute with p such that:
    $p(\sim x) = \approx p(x)$.
  Define $S^{i+1} = \{f \circ g | f \in S^i, g \in S^i\}$ so that elements of $S^i$ map (input-value) pairs to other (input-value) pairs in i steps.

The operations of the adversarial sample generation process 314 may be expressed as follows. Here, $S^i$ is obtained from the sample symmetries definition process 312, and the current intermediate model is obtained from the machine learning algorithm 308.

```
Adversaries A := 0
For d ∈ [1, 2, ...]: For (~, ≈) ∈ S^d: For (x, v) ∈ Data:
    If Natural(~x, ext) and F¹(p(~x), ≈p(x)) << F¹(x, p(x)):
        A := A ∪ {(~x, ≈p(x))}
    If |A| ≥ Rate(Data): break
Return A
```

Here, a set of adversarial examples (referred to as Adversaries) is initially empty. New adversarial examples are added to the set if the adversarial examples are natural (as defined by the naturalness evaluation data 320) and are selected based on their likelihood of being misclassified by the machine learning algorithm 308. The likelihood of being misclassified is defined here using $F_1$ scores, which are computed using the model obtained from the machine learning algorithm 308. This is defined in the expression "$F^1(p(\sim x), \approx p(x)) << F^1(x, p(x))$", where "$F^1(x, p(x))$" represents the score of an initial linguistic sample with a known classification (based on its annotation) and "$F^1(p(\sim x), \approx p(x))$" represents the score of an additional linguistic sample that should be classified similarly as the initial linguistic sample but is not when a misclassification may occur.

Note that the adversarial sample generation process 314 here can operate to produce additional training data 318 for the machine learning algorithm 308 while having little or no knowledge of how the machine learning algorithm 308 actually operates. Thus, the machine learning algorithm 308 may appear as a "black box" to the adversarial sample generation process 314, since the adversarial sample generation process 314 receives models 316 from the machine learning algorithm 308 and provides additional training data 318 to the machine learning algorithm 308 without knowledge of the machine learning algorithm's actual operation. Based on this, the actual implementation of the machine learning algorithm 308 may be immaterial, at least with respect to the adversarial sample generation process 314.

Figure 4A:
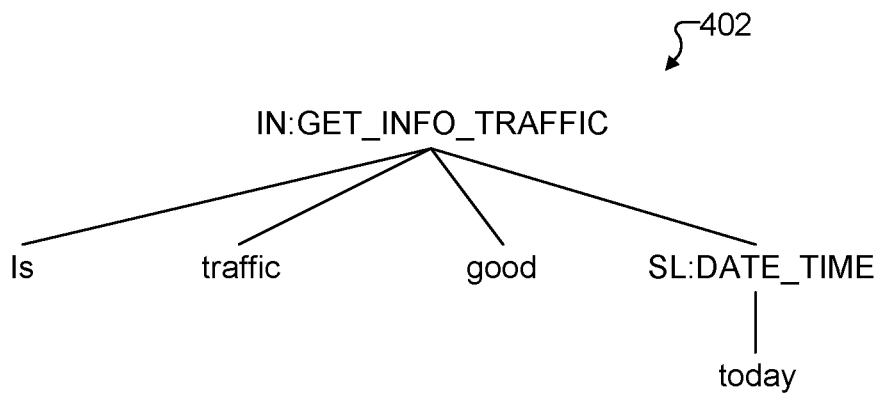
FIGS. 4A, 4B, and 4C illustrate an example use of the functional architecture shown in FIG. 3 in accordance with this disclosure.
Figure 4B:
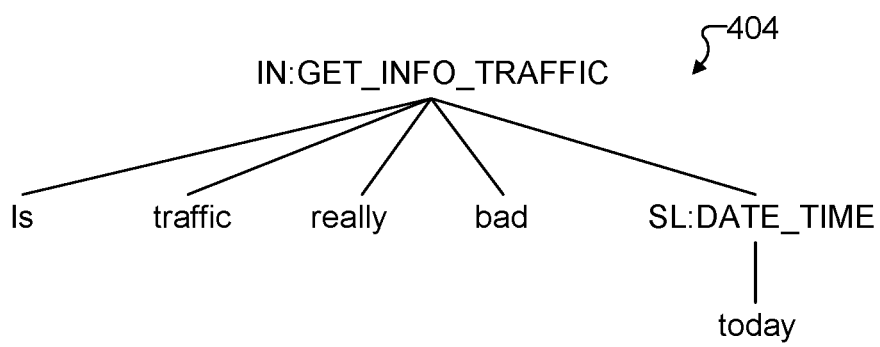
Figure 4C:
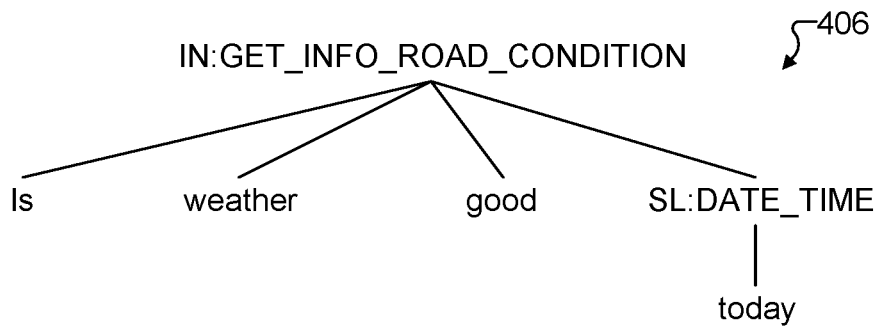

FIGS. 4A, 4B, and 4C illustrate an example use of the functional architecture 300 shown in FIG. 3 in accordance with this disclosure. In this example, assume that an annotated training dataset includes the phrase "Is traffic good today" mapped to a tree 402 as shown in FIG. 4A. Included in the tree 402 are various words of the input phrase, one of which ("today") has been mapped to a specific slot (called a DATE_TIME slot). The depth of this tree 402 is defined as the length of the longest path from the root to any leaf of the tree 402, which in this case is two. However, if recursively-nested tags are allowed, the annotated training dataset may include examples with depths up to eight, and tokenized input strings with lengths up to fifty-six may be used in the annotated training dataset. If the term "good" in this example is replaced by the words "really bad" on the source side while leaving the output unchanged, the input-output pair is no longer correct. However, the correct output is easily computed from the previous output simply by replacing the branch to "good" with branches to "really" and "bad", which is shown in a tree 404 in FIG. 4B.

This substitution is natural because "bad" is a very common adjectival modifier for traffic (and may even be more common than "good" in some n-gram counts). Also, "really" is a very common domain-neutral intensifier of "bad." Further, no change is needed on the output side because neither GET_INFO_TRAFFIC nor any other tag in this dataset distinguishes between positive and negative sentiments. Thus, the tree 404 can be formed in two steps, namely replacement of "good" with "bad" and insertion of the "really" adjunct.

Some relevant considerations for (string-edit, tree-edit) pairs involve syntactic analyses of the inputs (such as what modifies what, etc.) and naturalness assessments (such as based on external n-gram frequencies or other naturalness evaluation data 320). Even when a semantic task is restricted (such as to a limited number of intents and a limited number of slots) of this rather sparse formalism, even hundreds of training examples may not be adequate. Thus, baseline $F_1$ scores may be relatively low, and adversarial examples close to the training dataset can be very easy to find.

Since traffic and weather share many contexts in a training set (such as "Is there bad__"), the naturalness of contexts can be assessed for ones that are not shared by the other. For example, the word "weather" is natural in the context "Is there good _____", just as "traffic" is natural in that context. This may simply require only a change of the root tag on the output side from GET_INFO_TRAFFIC to GET_INFO_ROAD_CONDITION, which appears in a tree 406 shown in FIG. 4C. This provides an input-output pair that does not appear in the original training dataset. Similarly, the word "weather" can be substituted for "traffic" in the tree 402 to obtain an input-output pair, such as the input "Is traffic going to be bad for the Lakers game tonight" along with a corresponding change in the output tree.

This strategy of recursively maximizing overlapping substring sets and context sets maintains proximity to the original training dataset and is familiar from learning-theoretic approaches to language identification. Expanding with most frequent expressions first, it is possible to converge on a coarsest congruence of substrings that preserves the mapping p, where attention is restricted to modifications that do not cross the constituent boundaries of any element on the output side, modifications that preserve natural slot and intent semantics, and modifications that can be defined in terms of syntactic constituents (head plus contiguous dependents).

In some embodiments, various types of symmetries can be supported to recursively maximize overlapping substring sets and context sets while maintaining proximity to the original training dataset. The space defined by (string-edit, tree-edit) mappings of each of the following kinds can be considered and used, where these mappings are designed to preserve a semantic parse mapping and naturalness in the domain. For each kind of symmetry discussed below, an example input and some of its perturbations are provided (showing only the input since the needed changes on the output side are obvious). As discussed above, the perturbations do not need to preserve character-by-character identity or embeddings or meanings. Rather, the choice of these edits is to map expressions to other expressions that are "close" in terms of linguistic structure, so tree-edits corresponding to input-edits are easy to define. The following rules may be trivial and easy to implement for fluent English speakers, and similar types of symmetries may be used for various other languages, as well.

A first type of symmetry is referred to as substitution symmetries, where words or phrases are replaced with equivalent words or phrases or where details that are irrelevant to a task are substituted. Using this type of symmetry, only substitutions that are adversarial (cause a machine learning system misclassification) may be used. Also, the relevant sense of "equivalent" may depend on the specific machine learning task, and equivalents may come in (string-edit, tree-edit) pairs so even dominating intents or slots can change. In addition, all changes can be assessed for syntactic compatibility and naturalness, such as based on the naturalness evaluation data 320. Intuitively, these changes are "structurally small" but may not generally be small in surface form, meaning, or embeddings. Examples of this type of symmetry are as follows:

Is the traffic good today?
   Is the traffic bad today?
   Is the weather good today?
   Is the traffic good between 5 and 6 pm during weekdays?
   Is the traffic good on route 7 or route 40?

A second type of symmetry is referred to as permutation symmetries, where the order of words or phrases is switched or otherwise altered. This type of symmetry can involve changing verb-particle placements, preposing or postposing phrases, or swapping phrases. Examples of this type of symmetry are as follows:

Is the traffic good today?
   The traffic is good today?
   The traffic, is it good today?
   The traffic, good today?
   Is it good today, the traffic?
   Is it good, the traffic today?

A third type of symmetry is referred to as article or adjunct insertion/removal symmetries, where articles, adjuncts, or other modifiers can be added or removed. Examples of this type of symmetry are as follows:

Is the traffic good today?
   Is traffic good today?
   Is the traffic good?
   Is the traffic unusually good today?
   Is the traffic good today on route 280?
   Hey, is the traffic good?

A fourth type of symmetry is referred to as politeness insertion/removal symmetries, where politeness words or phrases can be added or removed. This may be particularly useful in task-oriented applications, although it is also useful in other applications. Examples of this type of symmetry are as follows:

Is the traffic good today?
   Tell me, is the traffic good today?
   Please check, is the traffic good today?

A fifth type of symmetry is referred to as punctuation insertion/removal symmetries, where punctuation can be added or removed. This may be particularly useful in applications where inputs are typed, although it is also useful in other applications. Examples of this type of symmetry are as follows:

Is the traffic good today?
   Is the traffic good today
   Is the traffic good ? today?
   Is. the. traffic. good. TODAY?

A sixth type of symmetry is referred to as character-level or word-level symmetries, where characters or words are manipulated to create typographical or grammatical errors. This can include swapping characters or words, as well as adding or removing blank spaces. Examples of this type of symmetry are as follows:

Is the traffic good today?
   Is thetraffic good today?
   Is the rtaffic good tday/?

Any or all of these example types of symmetries (as well as other or additional types of symmetries) may be used by the adversarial sample generation process 314 to create adversarial examples used to train a machine learning model. While certain types of symmetries are familiar in the data expansion literature, the adversarial use of those symmetries can be more beneficial than standard brute-force expansions. Thus, the approach described here can be used to improve model accuracy and can be more effective than standard data augmentation since (i) this approach identifies and trains using adversarial examples and (ii) this approach adapts to the model during training. As noted above, there are numerous perturbations of these sorts that might be used to generate the additional training data 318 based on the initial training data 306. In some cases, the perturbations can be ranked by the number of structure-based edits used in their derivation, so perturbations requiring fewer structure-based edits may be used before perturbations requiring more structure-based edits. Also, the use of the naturalness evaluation data 320 can help to ensure that the perturbations are natural, such as in the sense of not introducing uncommon n-grams. With this strategy, it is possible to identify any number of adversarial examples using original training data, whether the adversarial examples are generated in one or more steps.

The functional architecture 300 shown in FIG. 3 may be implemented in any suitable manner. For example, in some embodiments, at least the functions 308 and 314 (and possibly other functions of FIG. 3) can be implemented or supported using one or more software applications or other software instructions that are executed, such as by the processor 120 of the electronic device 101 or the server 106. In other embodiments, at least some of these functions may be implemented or supported using dedicated hardware components. In general, the functions can be performed using any suitable hardware or any suitable combination of hardware and software/firmware instructions.

Although FIG. 3 illustrates a first example of a functional architecture 300 for structured adversarial training for a natural language machine learning task, various changes may be made to FIG. 3. For example, various functions in FIG. 3 may be combined, further subdivided, replicated, or omitted and additional functions may be added according to particular needs. Also, the adversarial sample generation process 314 may be used in any other suitable process in which a natural language machine learning algorithm 308 trains a machine learning model 310 using training data.

Although FIGS. 4A, 4B, and 4C illustrate one example use of the functional architecture 300 shown in FIG. 3, various changes may be made to FIGS. 4A, 4B, and 4C. For instance, the functional architecture 300 may operate in any other suitable manner and is not limited to the particular use shown in FIGS. 4A, 4B, and 4C.

Figure 5:
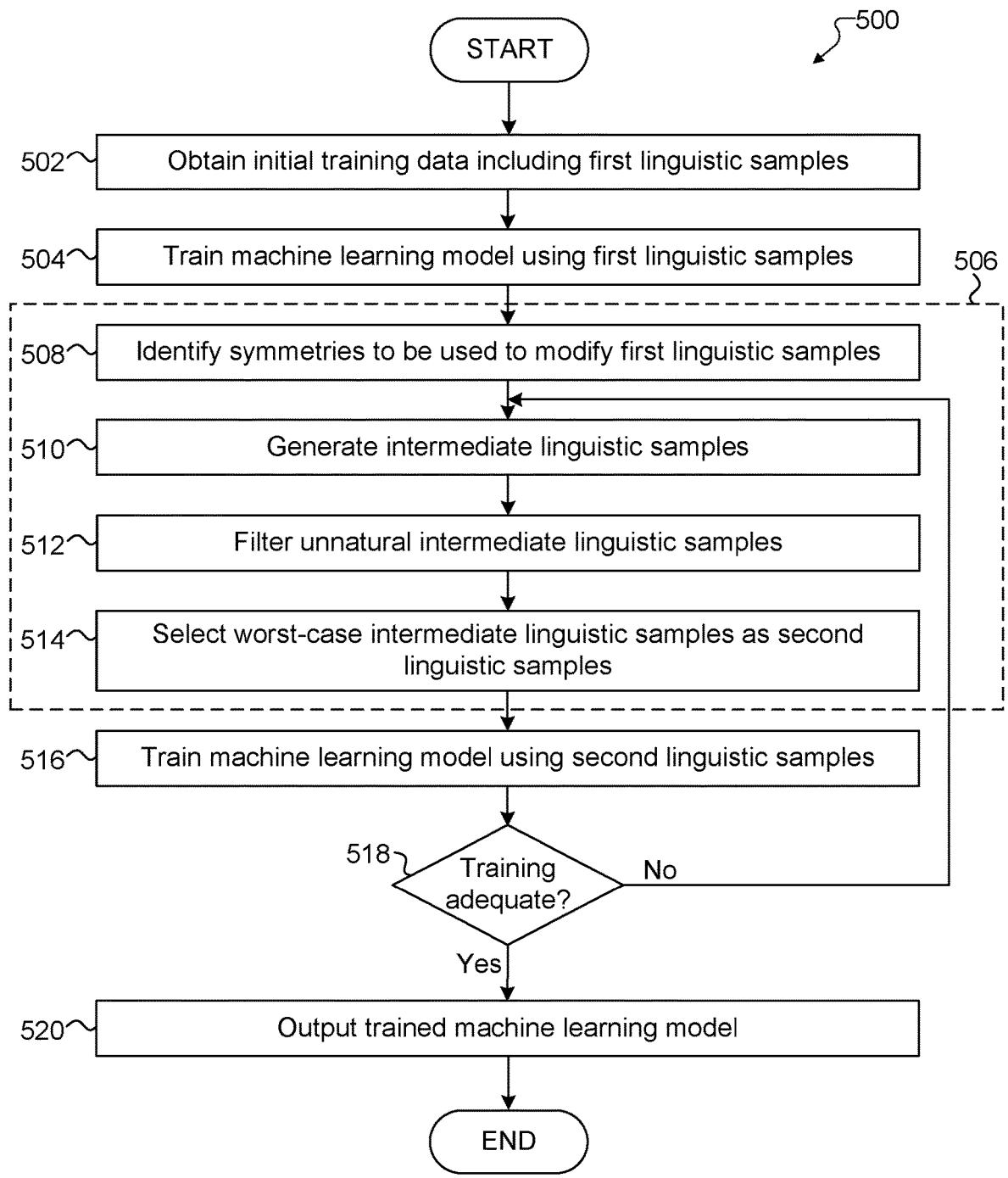
FIG. 5 illustrates a first example method for structured adversarial training for a natural language machine learning task in accordance with this disclosure.

FIG. 5 illustrates a first example method 500 for structured adversarial training for a natural language machine learning task in accordance with this disclosure. For ease of explanation, the method 500 shown in FIG. 5 may be described as being performed by the electronic device 101 or server 106 shown in FIG. 1 using the functional architecture 300 shown in FIG. 3 to supplement the training data available for use in training a natural language machine learning model. However, the method 500 shown in FIG. 5 may be used by any other suitable device(s), with any other suitable functional architecture(s), and in any other suitable system(s).

As shown in FIG. 5, initial training data that includes first linguistic samples is obtained at step 502. This may include, for example, the processor 120 of the electronic device 101 or server 106 obtaining initial training data 306 that includes a number of initial linguistic samples, where the initial linguistic samples have been annotated. A natural language machine learning model is trained using the initial training data at step 504. This may include, for example, the processor 120 of the electronic device 101 or server 106 executing the machine learning algorithm 308 to train an initial language model. For the purposes of FIG. 5, it is assumed that the initial language model is not adequately accurate as measured by some metric (such as $F_1$ or other score).

Additional training data for use in adversarial training of the machine learning model is generated at step 506. In this example, the additional training data is generated using various steps. Here, symmetries to be used to modify the first linguistic samples are identified at step 508. This may include, for example, the processor 120 of the electronic device 101 or server 106 obtaining information identifying (or itself identifying) one or more symmetries to be used to modify the initial linguistic samples in the initial training data 306. As described above, the symmetries here can be selected so that minor perturbations in linguistic structure lead to misclassifications by the machine learning algorithm 308. Intermediate linguistic samples are generated at step 510. This may include, for example, the processor 120 of the electronic device 101 or server 106 applying one or more of the identified symmetries to the initial linguistic samples in the initial training data 306. In some cases, the processor 120 may apply a single symmetry to create single changes to the initial linguistic samples in the initial training data 306, and the number of changes applied may increase until an adequate number of intermediate linguistic samples are generated. Unnatural intermediate linguistic samples are filtered and thereby removed from consideration at step 512. This may include, for example, the processor 120 of the electronic device 101 or server 106 using n-grams or other naturalness evaluation data 320 to identify any of the intermediate linguistic samples that might contain unnatural or unexpected content. Worst-case intermediate linguistic samples are identified as adversarial examples and selected for use as second linguistic samples at step 514. This may include, for example, the processor 120 of the electronic device 101 or server 106 using scores associated with the intermediate linguistic samples (such as $F_1$ scores) to identify which of the intermediate linguistic samples are likely to be improperly classified by the machine learning algorithm 308, while their corresponding initial linguistic samples are properly classified by the machine learning algorithm 308. This can be determined based on the initial model that has been trained.

The natural language machine learning model is adversarially trained using the second linguistic samples as additional training data at step 516. This may include, for example, the processor 120 of the electronic device 101 or server 106 executing the machine learning algorithm 308 to train an intermediate language model. Ideally, the intermediate model is more accurate than the prior version of the model, since the machine learning algorithm 308 has used adversarial examples generated specifically to help the machine learning algorithm 308 learn at least one additional generalization that can be used to classify input samples correctly. A determination is made whether the training is adequate at step 518. This may include, for example, the processor 120 of the electronic device 101 or server 106 determining whether the current intermediate language model is sufficiently accurate (such as based on an $F_1$ or other score). If not, the process returns to step 510 to perform another iteration of the training process with more additional training data. Otherwise, the current model is output as a trained machine learning model at step 520. This may include, for example, the processor 120 of the electronic device 101 or server 106 providing the current model as the final machine learning model 310, which can be used in a desired natural language application.

Although FIG. 5 illustrates a first example of a method 500 for structured adversarial training for a natural language machine learning task, various changes may be made to FIG. 5. For example, while shown as a series of steps, various steps in FIG. 5 may overlap, occur in parallel, occur in a different order, or occur any number of times. As a particular example, steps 510-518 may occur any number of times, such as until an adequate model accuracy is obtained, a specified number of training iterations have occurred, or no additional adversarial examples can be identified.

Figure 6:
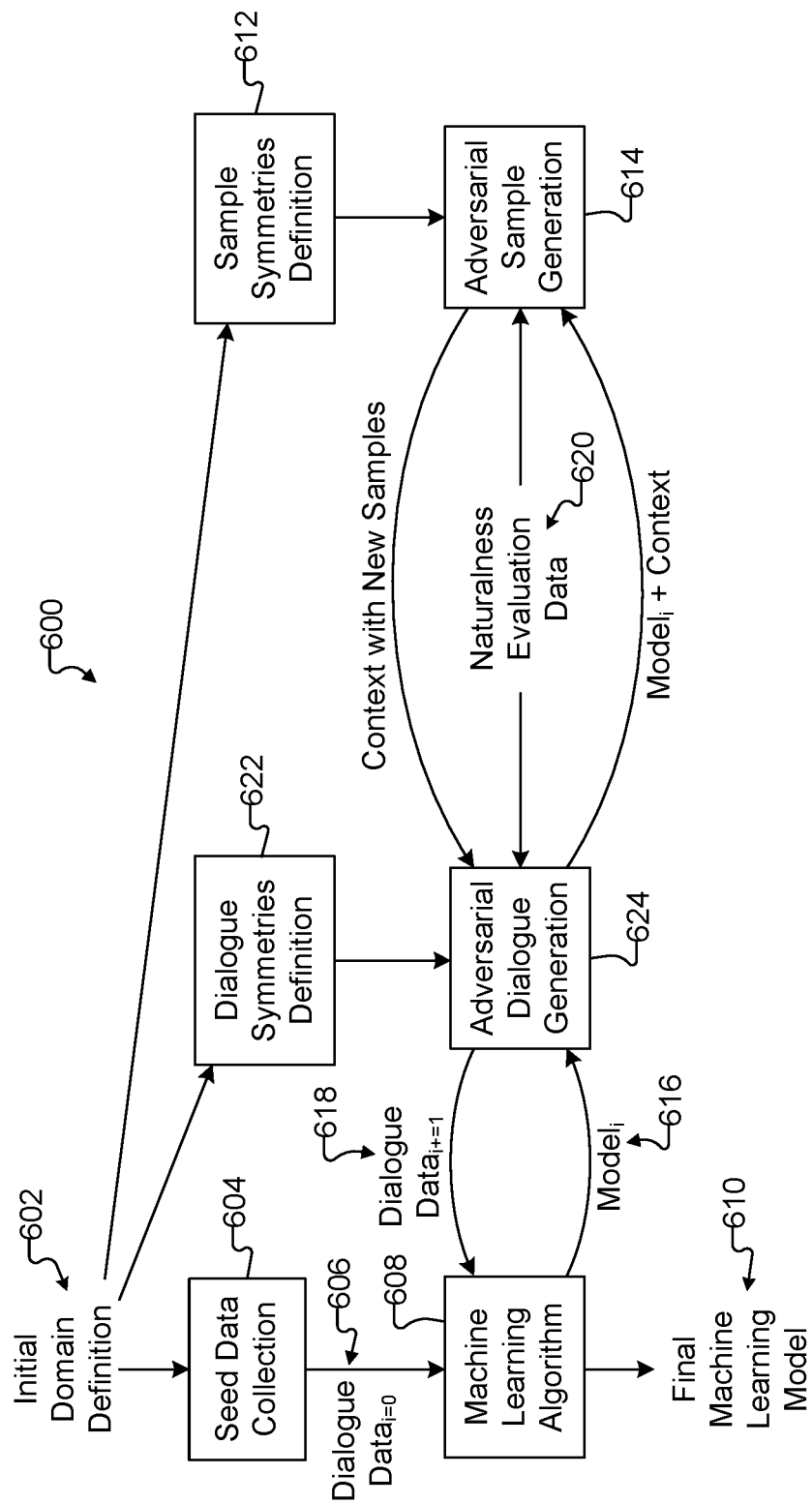
FIG. 6 illustrates a second example functional architecture for structured adversarial training for a natural language machine learning task in accordance with this disclosure.

FIG. 6 illustrates a second example functional architecture 600 for structured adversarial training for a natural language machine learning task in accordance with this disclosure. For ease of explanation, the functional architecture 600 shown in FIG. 6 may be described as being performed by the electronic device 101, server 106, or other component shown in FIG. 1 to supplement the training data available for use in training a natural language machine learning model. However, the functional architecture 600 shown in FIG. 6 may be used by any other suitable device(s) and in any other suitable system(s).

The approach described above with respect to FIG. 3 is useful in training a machine learning model by supplementing the available training data. Another area where this functionality can be used is in training a machine learning model to understand task-oriented, multi-step dialogues or other types of multi-utterance dialogues. Current dialogue systems often rely on tight scripting, but this is very difficult to do well and limits the scope of the dialogues that can be used. Better training may be obtained (using the approaches described here) to improve the operations of dialogue systems. Task-oriented spoken dialogue often has a number of features that make it an ideal place for using the approaches described here. These features include the use of a restricted domain, the use of shorter sentences (because it is spoken and goal-oriented), and the high value of spoken dialogue in many settings where goals can be complex and typing is not convenient.

Human task-oriented dialogue is typically collaborative, plan-based, and flexible, and it often introduces new terms and predicates that human speakers can typically track unproblematically. Ideally, a well-trained natural language model can track what happens at each step of a dialogue relative to the dialogue's context. However, the flexibility of dialogue makes end-to-end training of natural language machine learning models difficult, even when the domain is restricted and large amounts of training data are available. Structured adversarial training of a natural language machine learning model for dialogue, respecting the invariants of a domain, can address these shortcomings. As described below, this approach can treat utterance-level invariants similar to semantic parsing invariants as described above with respect to FIG. 3, where utterances represent individual linguistic samples in dialogues. Here, however, context is taken into account since previously-mentioned elements in utterances are often referred to with pronouns or indefinite descriptions, meaning descriptions beginning with indefinite articles. Dialogue symmetries are familiar, so they allow steps or subtasks to be reordered as long as subtask-dependency-based orderings are respected.

As shown in FIG. 6, an initial domain definition 602 is obtained, which represents a definition or representation of the domain for which a natural language machine learning model is to be trained. The initial domain definition 602 helps guide a seed data collection process 604, which represents a process used to collect initial training data 606. The initial training data 606 in this example is dialogue-based, meaning the initial training data 606 (denoted Dialogue $Data_{i=0}$) includes a number of different initial training dialogues (each typically containing a number of initial linguistic samples or utterances). A machine learning algorithm 608 is executed and used to train a machine learning model using (among other things) the initial training data 606, plus additional dialogue-based training data generated as described below. The training performed using the machine learning algorithm 608 is typically iterative in nature and can be repeated until an intermediate dialogue model is adequately accurate, at which point the intermediate model can be output as a final machine learning model 610. These components 602-610 may be the same as or similar to the corresponding components 302-310 in FIG. 3, except dialogue-based training is occurring here.

As described above, if the initial training data 606 is small or otherwise inadequate, it may be difficult to obtain a model 610 having the desired level of accuracy. Also, it may be desirable for a natural language system to be competent in its interactions with users based on very little training data, which can involve training a machine learning model over many dialogue contexts and user updates. In order to help overcome these or other problems, the functional architecture 600 supports the technique 200 described above with respect to FIG. 2 and expands the technique 200 for use with a dialogue-based application.

In this example, this is accomplished by performing a sample symmetries definition process 612, which is used to identify different symmetries that can be applied to the initial linguistic samples in the initial training data 606 in order to generate additional linguistic samples. This also includes using an adversarial sample generation process 614, which represents an automated process that implements the symmetries selected by the symmetries definition process 612 in order to generate the additional linguistic samples. The additional linguistic samples generated here can represent utterances that may be used to generate additional dialogue-based training data 618 for use by the machine learning algorithm 608. These components 612, 614 may be the same as or similar to the corresponding components 312, 314 in FIG. 3. However, the adversarial sample generation process 614 here considers both an intermediate model 616 (denoted $Model_t$) generated by the machine learning algorithm 608 and the context of a dialogue in each iteration of the training process.

The functional architecture 600 here also includes a dialogue symmetries definition process 622, which is used to identify different symmetries that can be applied to the dialogue-based initial training data 606 in order to generate additional dialogue-based training data 618. The different symmetries applied here can be used to help maintain various characteristics of the dialogue-based initial training data 606 while still allowing adversarial examples to be created. The dialogue symmetries definition process 622 may be performed manually or in an automated manner.

Examples of the types of symmetries that may be identified and selected in the dialogue symmetries definition process 622 can include permutation symmetries, which involve switching the order of steps or subtasks in a dialogue. For example, assume that a training dialogue includes subtasks $T_1, \ldots, T_k$ (also sometimes referred to as "turns") and $T_i$ and $T_{i+1}$ involve subtasks that are unordered (meaning subtasks whose order is immaterial). Given this, a permutation symmetry can generate an additional training dialogue with the $T_i$ and $T_{i+1}$ subtasks reversed. If multiple sets of subtasks in the same training dialogue are unordered, various combinations of subtask permutations can be created here based on a single training dialogue.

Another example of the types of symmetries that may be identified and selected in the dialogue symmetries definition process 622 can include interruption symmetries, which involve inserting a second dialogue into the steps of a first dialogue (effectively interrupting the execution of the first dialogue). For example, assume a first training dialogue includes subtasks $T_1, \ldots, T_k$ and a second training dialogue includes subtasks $S_1, \ldots, S_j$. Given that, an interruption symmetry can generate an additional training dialogue with subtasks $T_1, \ldots, T_i, S^1, \ldots S_j, T_{i+1}, \ldots, T_k$. If the first training dialogue can be interrupted at various points within the first training dialogue, multiple additional training dialogues may be generated by inserting the second training dialogue at different points into the first training dialogue.

Other types of symmetries that may be identified and selected in the dialogue symmetries definition process 622 could include those defined using rules for interruption removal, subtask addition or deletion, and various kinds of engagement maintenance. As before, changes on the input side may entail changes on the output dialogue representation. Also, utterance-level adjunct insertion may use one or more adjuncts from at least one other utterance (thereby "coarsening" the lattice of utterance-context pairs), and interruption insertion may find one or more interruptions to insert in at least one other dialogue.

The symmetries selected by the dialogue symmetries definition process 622 are used by an adversarial dialogue generation process 624, which represents an automated process that implements the symmetries selected by the dialogue symmetries definition process 622. In this example, the adversarial dialogue generation process 624 receives the intermediate model 616 generated by the machine learning algorithm 608 in one iteration of the training process, and the adversarial dialogue generation process 624 uses the intermediate model 616 to produce additional training data 618 (denoted Dialogue $Data_{i+=1}$) for use during a subsequent iteration of the training process. The additional training data

618 includes additional dialogue training samples, each of which includes utterances that may be from the original training data 606 or from the adversarial sample generation process 614. At least some of the additional dialogue training samples selected (based on the model 616) for use in the subsequent training iteration are adversarial examples, meaning the additional dialogue training samples are selected based on their likelihood of being misclassified by the machine learning algorithm 608 during the subsequent iteration of the training process.

At least some of the additional training dialogues generated by the adversarial dialogue generation process 624 may include initial linguistic samples (utterances) from the dialogues in the initial training data 606 after one or more of the symmetries selected by the dialogue symmetries definition process 622 have been applied. Thus, some additional training dialogues may include the initial linguistic samples from the initial training dialogues, but several of the initial linguistic samples may be reordered in the additional training dialogues (compared to the initial training dialogues) to provide permutation symmetry. Also, some additional training dialogues may include the initial linguistic samples from the initial training dialogues, but the initial linguistic samples from one initial training dialogue may be inserted at one or more points into another initial training dialogue to provide interruption symmetry. In this way, the adversarial dialogue generation process 624 may generate a number of additional dialogue-based training samples for the machine learning algorithm 608.

Not only that, at least some of the additional training dialogues generated by the adversarial dialogue generation process 624 include additional linguistic samples (utterances) generated by the adversarial sample generation process 614 based on the initial linguistic samples contained in the dialogues of the initial training data 606. For example, the adversarial dialogue generation process 624 can replace initial linguistic samples in the dialogues of the initial training data 606 with additional linguistic samples generated by the adversarial sample generation process 614. Here, the adversarial sample generation process 614 uses the symmetries selected by the symmetries definition process 612 in order to generate the additional linguistic samples that can be inserted in place of or used with the initial linguistic samples in the training data 606 to generate additional training dialogues.

In this process, the adversarial sample generation process 614 may support various symmetries for generating a large number of additional linguistic samples. Also, the adversarial dialogue generation process 624 may support various symmetries for generating a large number of additional dialogue samples. By combining these approaches, it is possible to generate an enormous amount of dialogue-based additional training data 618 for the machine learning algorithm 608, even if only a limited amount of initial training data 606 is available. For example, the adversarial dialogue generation process 624 may reorder the linguistic samples contained in initial training dialogues and also replace the linguistic samples in the initial training dialogues with corresponding additional linguistic samples from the adversarial sample generation process 614. Similarly, the adversarial dialogue generation process 624 may interrupt the linguistic samples contained in initial training dialogues with the linguistic samples contained in other initial training dialogues and also replace the linguistic samples in the initial training dialogues with corresponding additional linguistic samples from the adversarial sample generation process 614. Essentially, this approach multiplies the number of permutations used to generate the additional linguistic samples with the number of permutations used to modify the initial training dialogues.

Naturalness evaluation data 620 can be used here to provide information to the adversarial sample generation process 614 and to the adversarial dialogue generation process 624 for use in excluding unnatural automatically-generated additional linguistic samples and unnatural automatically-generated additional dialogues, respectively. For example, the naturalness evaluation data 620 may represent or include n-grams associated with the language used in the initial training data 606, as well as knowledge graphs, dialogue models, or other information identifying what types of dialogues are deemed natural or unnatural. The sample symmetries definition process 612 can use at least some of the naturalness evaluation data 620 to exclude unnatural additional linguistic samples from being provided to the adversarial dialogue generation process 624. The adversarial dialogue generation process 624 can use at least some of the naturalness evaluation data 620 to determine dialogue naturalness based on, for instance, dialogue properties, knowledge-based reasoning, or background knowledge about the tasks involved. As a particular example of this, a reservation dialogue would typically not involve a user making a reservation and then providing information about the reservation, such as its time and location. Thus, the reordering of the subtasks associated with the reservation dialogue may be allowed, but certain orderings may be excluded as being unnatural. In some cases, changes at the utterance level of a dialogue may be allowed to alter a previous context, as long as the result is still natural as assessed using the naturalness evaluation data 620.

In some embodiments, the components of the functional architecture 600 may operate according to the following pseudocode. It should be noted, however, that other implementations of the functional architecture 600 are also possible. The operations of the machine learning algorithm 608 may be expressed using the same pseudocode described above with respect to the operations of the machine learning algorithm 308. While the machine learning algorithm 608 in this example uses training data based on dialogues, the overall process performed by the machine learning algorithm 608 can be the same as (or substantially similar to) the operations of the machine learning algorithm 308 described above.

The operations of the sample symmetries definition process 612 and the dialogue symmetries definition process 622 may be expressed as follows.

Given the task mapping p: dialogues→values:
Define sets $S^1_D$, $S^1_U$ of dialogue and utterance symmetries of p that are minimal input-edit, output-edit mappings ($\sim$, $\approx$) that commute with p such that:
$P(\sim x) = \approx p(x)$.
Define $S^{i+1} = \{f \circ g | f \in S^i_a, g \in S^i_b \text{ for } a, b \in \{D, U\}\}$ so that elements of $S^i$ map (dialogue-value) pairs to other (dialogue-value) pairs in i steps.

Note that utterance (U) and dialogue (D) perturbations here can be applied in any suitable order, and both are contained in or accounted for by the "distance" index i. The perturbations may be weighted differently, although they may also be weighted equally for simplicity.

The operations of the adversarial sample generation process 614 and the adversarial dialogue generation process 624 may be expressed as follows, where $S^i$ is obtained from the sample symmetries definition process 612 and the current intermediate model is obtained from the machine learning algorithm 608.

```
Adversaries A := 0
For d ∈ [1, 2, ...]: For (~, ≈) ∈ S^d: For (x, v) ∈ Data:
    If Natural_U(~x, Context, n-gram) and Natural_D(~x, Model, KB)
    and F^1(p(~x), ≈p(x)) << F^1(x, p(x)):
        A := A ∪ {(~x, ≈p(x))}
    If |A| ≥ Rate(Data): break
Return A
```

Again, the set of adversarial examples is initially blank, and new dialogue-based adversarial examples are added to the set, assuming (i) the linguistic samples in the dialogue-based adversarial examples are natural at the utterance-level and (ii) the dialogue-based adversarial examples are natural at the dialogue-level. Here, utterance-level naturalness can be assessed based on the context and n-grams, and dialogue-level naturalness can be assessed based on the properties of the intermediate model 616 and other knowledge (such as knowledge graphs or dialogue models). Also, the scores here (which in this example are $F_1$ scores) may be generated per dialogue, since the full prior context may be needed for scoring most dialogue state tracking annotations.

Once again, the adversarial sample generation process 614 and the adversarial dialogue generation process 624 here can operate to produce additional training data 618 for the machine learning algorithm 608 while having little or no knowledge of how the machine learning algorithm 608 actually operates. Based on this, the actual implementation of the machine learning algorithm 608 may be immaterial, at least with respect to the adversarial sample generation process 614 and the adversarial dialogue generation process 624.

The functional architecture 600 shown in FIG. 6 may be implemented in any suitable manner. For example, in some embodiments, at least the functions 608, 614, 624 (and possibly other functions of FIG. 6) can be implemented or supported using one or more software applications or other software instructions that are executed, such as by the processor 120 of the electronic device 101 or the server 106. In other embodiments, at least some of these functions may be implemented or supported using dedicated hardware components. In general, the functions can be performed using any suitable hardware or any suitable combination of hardware and software/firmware instructions.

Although FIG. 6 illustrates a second example of a functional architecture 600 for structured adversarial training for a natural language machine learning task, various changes may be made to FIG. 6. For example, various functions in FIG. 6 may be combined, further subdivided, replicated, or omitted and additional functions may be added according to particular needs. Also, the adversarial sample generation process 614 and the adversarial dialogue generation process 624 may be used in any other suitable process in which a natural language machine learning algorithm 608 trains a machine learning model 610 using dialogue-based training data.

Figure 7:
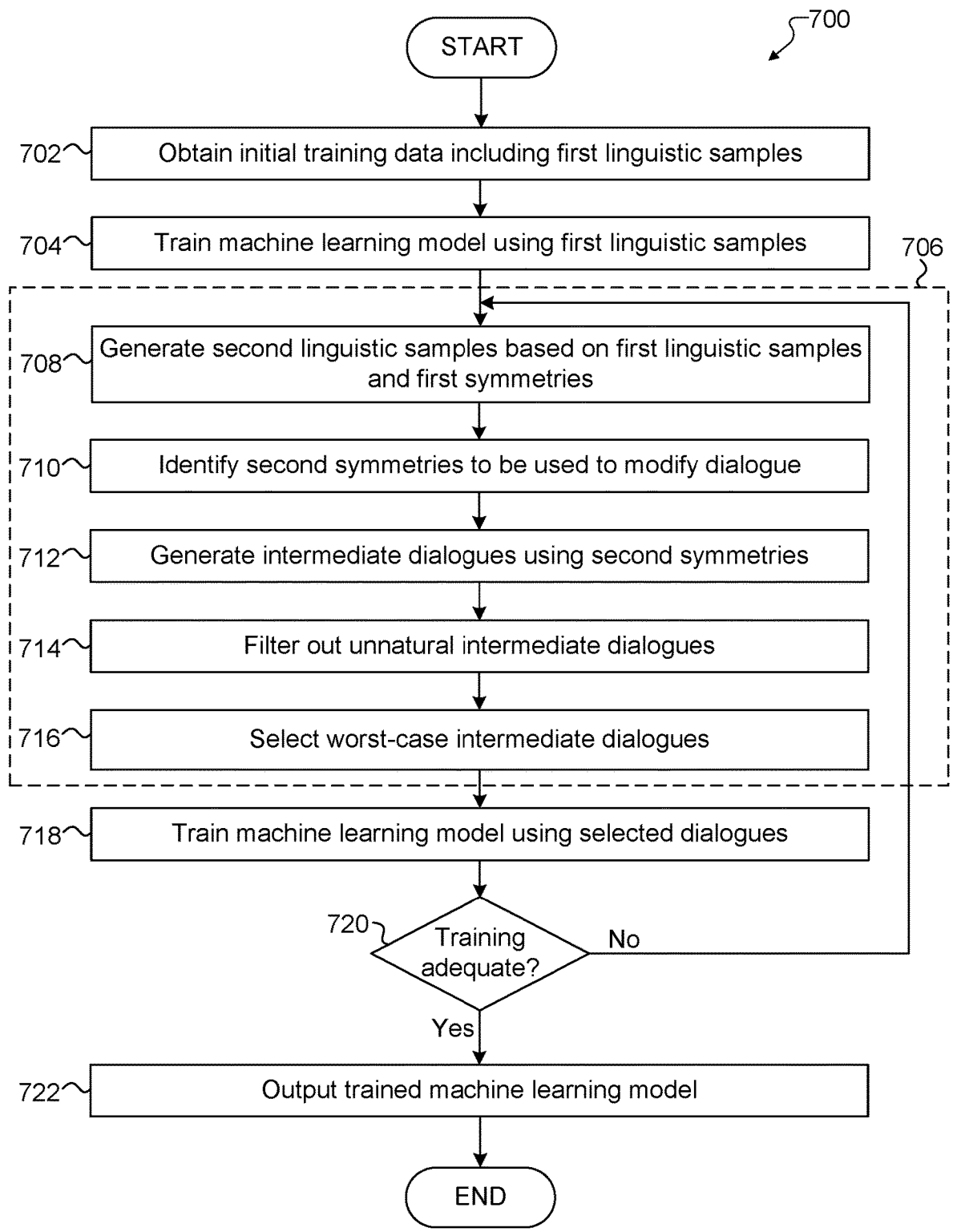
FIG. 7 illustrates a second example method for structured adversarial training for a natural language machine learning task in accordance with this disclosure.

FIG. 7 illustrates a second example method 700 for structured adversarial training for a natural language machine learning task in accordance with this disclosure. For ease of explanation, the method 700 shown in FIG. 7 may be described as being performed by the electronic device 101 or server 106 shown in FIG. 1 using the functional architecture 600 shown in FIG. 6 to supplement the dialogue-based training data available for use in training a natural language machine learning model. However, the method 700 shown in FIG. 7 may be used by any other suitable device(s), with any other suitable functional architecture(s), and in any other suitable system(s).

As shown in FIG. 7, initial training data that includes first linguistic samples is obtained at step 702. This may include, for example, the processor 120 of the electronic device 101 or server 106 obtaining dialogue-based initial training data 606 that includes a number of training dialogues each formed by multiple utterances (initial linguistic samples), where the initial training data 606 has been annotated. A natural language machine learning model is trained using the dialogue-based initial training data at step 704. This may include, for example, the processor 120 of the electronic device 101 or server 106 executing the machine learning algorithm 608 to train an initial dialogue model. For the purposes of FIG. 7, it is assumed that the initial dialogue model is not adequately accurate as measured by some metric (such as $F_1$ or other score).

Additional training data for use in adversarial training of the machine learning model is generated at step 706. In this example, the additional training data is generated using various steps. Here, second linguistic samples are generated based on the first linguistic samples and first symmetries at step 708. This may include, for example, the processor 120 of the electronic device 101 or server 106 performing steps 508-514 as described above. Second symmetries to be used to modify the training dialogues are identified at step 710. This may include, for example, the processor 120 of the electronic device 101 or server 106 obtaining information identifying (or itself identifying) one or more symmetries to be used to modify the initial training dialogues in the initial training data 606. As described above, the symmetries here can be selected so that utterances in the initial training dialogues are reordered, interrupted, or otherwise used in a manner likely to lead to misclassifications by the machine learning algorithm 608. Intermediate dialogues are generated at step 712. This may include, for example, the processor 120 of the electronic device 101 or server 106 applying one or more of the identified dialogue symmetries to the initial training dialogues in the initial training data 606 and, in at least some cases, inserting the second linguistic samples in place of the first linguistic samples in the training dialogues. Unnatural dialogues are filtered and thereby removed from consideration at step 714. This may include, for example, the processor 120 of the electronic device 101 or server 106 using properties of the initial model 616 and knowledge graphs, dialogue models, or other naturalness evaluation data 620 to identify any of the intermediate dialogues that might contain unnatural or unexpected content. Worst-case intermediate dialogues are identified as adversarial examples and selected for use during training at step 716. This may include, for example, the processor 120 of the electronic device 101 or server 106 using scores associated with the intermediate dialogues (such as $F_1$ scores) to identify which of the intermediate dialogues are likely to be improperly classified by the machine learning algorithm 608, while their corresponding initial dialogues are properly classified by the machine learning algorithm 608. This can be determined based on the initial model that has been trained.

The natural language machine learning model is adversarially trained using the selected dialogues as additional training data at step 718. This may include, for example, the processor 120 of the electronic device 101 or server 106 executing the machine learning algorithm 608 to train an intermediate dialogue model. Ideally, the intermediate model is more accurate than the prior version of the model, since the machine learning algorithm 608 has used adversarial examples generated specifically to help the machine learning algorithm 608 learn at least one additional generalization that can be used to classify input samples correctly. A determination is made whether the training is adequate at step 720. This may include, for example, the processor 120 of the electronic device 101 or server 106 determining whether the current intermediate dialogue model is sufficiently accurate (such as based on an $F_1$ or other score). If not, the process returns to step 708 to perform another iteration of the training process with more additional training data. Otherwise, the current model is output as a trained machine learning model at step 722. This may include, for example, the processor 120 of the electronic device 101 or server 106 providing the current model as the final machine learning model 610, which can be used in a desired dialogue-based natural language application.

Although FIG. 7 illustrates a second example of a method 700 for structured adversarial training for a natural language machine learning task, various changes may be made to FIG. 7. For example, while shown as a series of steps, various steps in FIG. 7 may overlap, occur in parallel, occur in a different order, or occur any number of times. As a particular example, steps 708-718 may occur any number of times, such as until an adequate model accuracy is obtained, a specified number of training iterations have occurred, or no additional adversarial examples can be identified.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
    obtaining first training data comprising multiple first linguistic samples, the first linguistic samples contained in first dialogue samples associated with a context;
    generating second training data using the first training data and multiple symmetries, the symmetries identifying how to modify the first linguistic samples while maintaining structural invariants within the first linguistic samples, the second training data comprising multiple second linguistic samples;
    generating second dialogue samples associated with the context, at least some of the second dialogue samples containing the second linguistic samples; and
    training a machine learning model using at least the second training data and the second dialogue samples, wherein at least some of the second linguistic samples in the second training data are selected during the training based on a likelihood of being misclassified by the machine learning model.

2. The method of claim 1, wherein the multiple symmetries comprise:
    substitution symmetries in which words or phrases in the first linguistic samples are replaced with other words or phrases;
    permutation symmetries in which words or phrases in the first linguistic samples are moved within the first linguistic samples;
    insertion/deletion symmetries in which words, phrases, or punctuations are added to or removed from the first linguistic samples; and
    character-level or word-level symmetries in which characters or words in the first linguistic samples are manipulated to create typographical or grammatical errors.

3. The method of claim 2, wherein:
    the substitution symmetries comprise at least one of: (i) replacing words or phrases in the first linguistic samples with equivalent words or phrases and (ii) substituting details in the first linguistic samples that are irrelevant to a task;
    the permutation symmetries comprise switching an order of words or phrases in the first linguistic samples;
    the insertion/deletion symmetries comprise at least one of: (i) inserting or removing articles or adjuncts in the first linguistic samples, (ii) inserting or removing politeness words or phrases in the first linguistic samples, and (iii) inserting or removing punctuation in the first linguistic samples; and
    the character-level or word-level symmetries comprise at least one of: (i) swapping characters or words in the first linguistic samples and (ii) adding or removing blank spaces in the first linguistic samples.

4. The method of claim 2, wherein the substitution symmetries comprise (i) replacing words or phrases in the first linguistic samples with equivalent words or phrases and (ii) substituting details in the first linguistic samples that are irrelevant to a task.

5. The method of claim 1, wherein generating the second training data comprises:
    applying the symmetries to the first linguistic samples to produce intermediate linguistic samples;
    filtering the intermediate linguistic samples to remove unnatural linguistic samples; and
    selecting one or more of the intermediate linguistic samples as the second linguistic samples for use in training the machine learning model, wherein the one or more selected intermediate linguistic samples (i) are relevant to a task associated with the first linguistic samples, (ii) lack new annotations relative to the first linguistic samples, and (iii) correct one or more misclassifications made by a prior version of the machine learning model.

6. The method of claim 1, wherein each of the structural invariants represents a linguistic object that cannot be replaced by another linguistic object while preserving how a meaning of an expression is determined, the structural invariants defined at least partially by a task to be learned by the machine learning model.

7. The method of claim 1, wherein generating the second dialogue samples comprises at least one of:
    reordering at least some of the first linguistic samples in the first dialogue samples while maintaining the context to provide permutation symmetry; and
    inserting one of the first dialogue samples into another of the first dialogue samples to provide interruption symmetry.

8. An apparatus comprising:
    at least one memory configured to store first training data comprising multiple first linguistic samples, the first linguistic samples contained in first dialogue samples associated with a context; and
    at least one processor configured to:
        generate second training data using the first training data and multiple symmetries, the symmetries identifying how to modify the first linguistic samples while maintaining structural invariants within the first linguistic samples, the second training data comprising multiple second linguistic samples;
        generate second dialogue samples associated with the context, at least some of the second dialogue samples containing the second linguistic samples; and train a machine learning model using at least the second training data and the second dialogue samples;

wherein the at least one processor is configured to select at least some of the second linguistic samples in the second training data during the training based on a likelihood of being misclassified by the machine learning model.

9. The apparatus of claim 8, wherein the multiple symmetries comprise:
  substitution symmetries in which words or phrases in the first linguistic samples are replaced with other words or phrases;
  permutation symmetries in which words or phrases in the first linguistic samples are moved within the first linguistic samples;
  insertion/deletion symmetries in which words, phrases, or punctuations are added to or removed from the first linguistic samples; and
  character-level or word-level symmetries in which characters or words in the first linguistic samples are manipulated to create typographical or grammatical errors.

10. The apparatus of claim 9, wherein:
  the substitution symmetries comprise at least one of: (i) replacing words or phrases in the first linguistic samples with equivalent words or phrases and (ii) substituting details in the first linguistic samples that are irrelevant to a task;
  the permutation symmetries comprise switching an order of words or phrases in the first linguistic samples;
  the insertion/deletion symmetries comprise at least one of: (i) inserting or removing articles or adjuncts in the first linguistic samples, (ii) inserting or removing politeness words or phrases in the first linguistic samples, and (iii) inserting or removing punctuation in the first linguistic samples; and
  the character-level or word-level symmetries comprise at least one of: (i) swapping characters or words in the first linguistic samples and (ii) adding or removing blank spaces in the first linguistic samples.

11. The apparatus of claim 9, wherein the substitution symmetries comprise (i) replacing words or phrases in the first linguistic samples with equivalent words or phrases and (ii) substituting details in the first linguistic samples that are irrelevant to a task.

12. The apparatus of claim 8, wherein, to generate the second training data, the at least one processor is configured to:
  apply the symmetries to the first linguistic samples to produce intermediate linguistic samples;
  filter the intermediate linguistic samples to remove unnatural linguistic samples; and
  select one or more of the intermediate linguistic samples as the second linguistic samples for use in training the machine learning model, wherein the one or more selected intermediate linguistic samples (i) are relevant to a task associated with the first linguistic samples, (ii) lack new annotations relative to the first linguistic samples, and (iii) correct one or more misclassifications made by a prior version of the machine learning model.

13. The apparatus of claim 7, wherein, to generate the second dialogue samples, the at least one processor is configured to at least one of:
  reorder at least some of the first linguistic samples in the first dialogue samples while maintaining the context to provide permutation symmetry; and
  insert one of the first dialogue samples into another of the first dialogue samples to provide interruption symmetry.

14. The apparatus of claim 8, wherein each of the structural invariants represents a linguistic object that cannot be replaced by another linguistic object while preserving how a meaning of an expression is determined, the structural invariants defined at least partially by a task to be learned by the machine learning model.

15. A non-transitory computer readable medium containing instructions that when executed cause at least one processor to:
  obtain first training data comprising multiple first linguistic samples, the first linguistic samples contained in first dialogue samples associated with a context;
  generate second training data using the first training data and multiple symmetries, the symmetries identifying how to modify the first linguistic samples while maintaining structural invariants within the first linguistic samples, the second training data comprising multiple second linguistic samples;
  generate second dialogue samples associated with the context, at least some of the second dialogue samples containing the second linguistic samples; and
  train a machine learning model using at least the second training data and the second dialogue samples;
  wherein the instructions that when executed cause the at least one processor to generate the second training data comprise:
    instructions that when executed cause the at least one processor to select at least some of the second linguistic samples in the second training data during the training based on a likelihood of being misclassified by the machine learning model.

16. The non-transitory computer readable medium of claim 15, wherein the multiple symmetries comprise:
  substitution symmetries in which words or phrases in the first linguistic samples are replaced with other words or phrases;
  permutation symmetries in which words or phrases in the first linguistic samples are moved within the first linguistic samples;
  insertion/deletion symmetries in which words, phrases, or punctuations are added to or removed from the first linguistic samples; and
  character-level or word-level symmetries in which characters or words in the first linguistic samples are manipulated to create typographical or grammatical errors.

17. The non-transitory computer readable medium of claim 16, wherein:
  the substitution symmetries comprise at least one of: (i) replacing words or phrases in the first linguistic samples with equivalent words or phrases and (ii) substituting details in the first linguistic samples that are irrelevant to a task;
  the permutation symmetries comprise switching an order of words or phrases in the first linguistic samples;
  the insertion/deletion symmetries comprise at least one of: (i) inserting or removing articles or adjuncts in the first linguistic samples, (ii) inserting or removing politeness words or phrases in the first linguistic samples, and (iii) inserting or removing punctuation in the first linguistic samples; and
  the character-level or word-level symmetries comprise at least one of: (i) swapping characters or words in the first linguistic samples and (ii) adding or removing blank spaces in the first linguistic samples.

18. The non-transitory computer readable medium of claim 15, wherein the instructions that when executed cause the at least one processor to generate the second training data comprise:
instructions that when executed cause the at least one processor to:
apply the symmetries to the first linguistic samples to produce intermediate linguistic samples;
filter the intermediate linguistic samples to remove unnatural linguistic samples; and
select one or more of the intermediate linguistic samples as the second linguistic samples for use in training the machine learning model, wherein the one or more selected intermediate linguistic samples (i) are relevant to a task associated with the first linguistic samples, (ii) lack new annotations relative to the first linguistic samples, and (iii) correct one or more misclassifications made by a prior version of the machine learning model.

19. The non-transitory computer readable medium of claim 15, wherein the instructions that when executed cause the at least one processor to generate the second dialogue samples comprise:
instructions that when executed cause the at least one processor to at least one of:
reorder at least some of the first linguistic samples in the first dialogue samples while maintaining the context to provide permutation symmetry; and
insert one of the first dialogue samples into another of the first dialogue samples to provide interruption symmetry.

20. The non-transitory computer readable medium of claim 15, wherein each of the structural invariants represents a linguistic object that cannot be replaced by another linguistic object while preserving how a meaning of an expression is determined, the structural invariants defined at least partially by a task to be learned by the machine learning model.

* * * * *